US008500937B2

United States Patent
Kitada et al.

(10) Patent No.: US 8,500,937 B2
(45) Date of Patent: Aug. 6, 2013

(54) MANUFACTURING SYSTEM OF OPTICAL DISPLAY DEVICE AND MANUFACTURING METHOD OF OPTICAL DISPLAY DEVICE

(75) Inventors: Kazuo Kitada, Ibaraki (JP); Satoru Koshio, Ibaraki (JP); Takuya Nakazono, Ibaraki (JP); Tomokazu Yura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/951,452

(22) Filed: Nov. 22, 2010

(65) Prior Publication Data

US 2011/0061801 A1 Mar. 17, 2011

Related U.S. Application Data

(62) Division of application No. 12/811,640, filed as application No. PCT/JP2008/073420 on Dec. 24, 2008.

(30) Foreign Application Priority Data

Jan. 9, 2008 (JP) ................................. 2008-002428
Dec. 19, 2008 (JP) ................................. 2008-324290

(51) Int. Cl.
*B32B 38/10* (2006.01)

(52) U.S. Cl.
USPC ........... 156/247; 156/248; 156/297; 156/719; 156/349; 156/443; 156/449; 156/494; 156/750; 156/759; 156/767

(58) Field of Classification Search
USPC ............................................ 156/60, 428, 427
See application file for complete search history.

(56) References Cited

U.S. PATENT DOCUMENTS 5,492,590 A * 2/1996 Sakai ............................ 156/701
5,766,402 A * 6/1998 Muraoka et al. .............. 156/361

(Continued)

FOREIGN PATENT DOCUMENTS

EP 1 962 258 A1 8/2008
JP 57-052017 A 3/1982

(Continued)

OTHER PUBLICATIONS

Japanese Office Action dated Feb. 22, 2011, issued in corresponding Japanese Patent Application No. 2010-134190.

(Continued)

*Primary Examiner* — Katarzyna Wyrozebski Lee
*Assistant Examiner* — Margaret Squalls
(74) *Attorney, Agent, or Firm* — Westerman, Hattori, Daniels & Adrian, LLP

(57) ABSTRACT

A manufacturing system of an optical display device in which the following can be attained in the case of bonding optical members to optical display units, respectively: an optical member to be excluded, which is, for example, an optical member judged as a defective member, can be appropriately excluded so that the optical member is not bonded onto any optical display unit and a manufacturing method of an optical display device. The manufacturing system includes a cutting device 16 to cut a optical member without cutting a releasing film, in a long laminated optical product having the optical member and the releasing film laid on the optical member, thereby form, on the releasing film, the optical member bonded onto the optical display unit and having the predetermined size, and an optical member to be excluded, an bonding device 18 to bond the optical member of the predetermined size onto the optical display unit W while or after the releasing film is peeled from the optical member of the predetermined size, and an excluding device 19 having a pressure-sensitive adhesive surface, excludes the optical member to bond onto the pressure-sensitive adhesive surface.

6 Claims, 14 Drawing Sheets

U.S. PATENT DOCUMENTS

| | | | |
|---|---|---|---|
| 6,500,291 B1 * | 12/2002 | Okada et al. | 156/230 |
| 7,022,204 B2 | 4/2006 | Kanbara et al. | |
| 7,202,923 B2 | 4/2007 | Yamabuchi et al. | |
| 7,388,628 B2 | 6/2008 | Yamabuchi et al. | |
| 7,543,621 B2 | 6/2009 | Kanbara et al. | |
| 2001/0017189 A1 * | 8/2001 | Tsujimoto et al. | 156/344 |
| 2001/0025688 A1 * | 10/2001 | Kubert et al. | 156/247 |
| 2004/0095526 A1 | 5/2004 | Yamabuchi et al. | |
| 2004/0169809 A1 | 9/2004 | Yamabuchi et al. | |
| 2005/0016670 A1 | 1/2005 | Kanbara et al. | |
| 2006/0055314 A1 * | 3/2006 | Nakamura et al. | 313/500 |
| 2006/0124248 A1 | 6/2006 | Kanbara et al. | |
| 2007/0013858 A1 | 1/2007 | Yamabuchi et al. | |
| 2009/0050261 A1 * | 2/2009 | Suehara et al. | 156/234 |
| 2009/0159175 A1 | 6/2009 | Nakahira et al. | |
| 2009/0218049 A1 | 9/2009 | Kanbara et al. | |

FOREIGN PATENT DOCUMENTS

| | | | |
|---|---|---|---|
| JP | 57052017 A * | 3/1982 | |
| JP | 2005-037416 A | 2/2005 | |
| JP | 2007-123616 A | 5/2007 | |
| JP | 2007-140046 A | 6/2007 | |
| JP | 2008-26631 A | 2/2008 | |
| WO | 03/046647 A1 | 6/2003 | |

OTHER PUBLICATIONS

International Search Report of PCT/JP2008/073420, Mailing Date of Mar. 24, 2009.

Notification of Transmittal of Translation of the International Preliminary Report on Patentability (Form PCT/IB/338) of International Application No. PCT/JP2008/073420 mailed Aug. 19, 2010, with Forms PCT/IB/373 and PCT/ISA/237.

Chinese Office Action dated Dec. 16, 2011, issued in corresponding Chinese Patent Application No. 200880124415.2.

Chinese Office Action dated Apr. 6, 2012, issued in corresponding application 201010228926.8, with English Translation.

Chinese Office Action dated Aug. 13, 2012, issued in corresponding Chinese Patent Application No. 201010228926.8, (11 pages). With English Translation.

Taiwanese Office Action dated Mar. 15, 2013, issued in corresponding Taiwanese Patent Application No. 097151097, w/ English translation.

* cited by examiner

MANUFACTURING SYSTEM OF OPTICAL DISPLAY DEVICE AND MANUFACTURING METHOD OF OPTICAL DISPLAY DEVICE

CROSS-REFERENCE OF RELATED CASES

This application is a divisional of U.S. Application No. 12,811,640, filed on Jul. 2, 2010, which is a National Stage of International Application No. PCT/JP2008/073420, filed on Dec. 24, 2008, which is based upon and claims priority of Japanese Application No. JP2008-002428, filed on Jan. 9, 2008, and Japanese Application No. JP2008-324290, filed on Dec. 19, 2008.

TECHNICAL FIELD

The present invention relates to a manufacturing system of an optical display device having an optical display unit, and an optical member bonded onto the optical display unit and having a predetermined size, and a manufacturing method thereof.

BACKGROUND ART

Hitherto, a manufacturing method of Patent Document 1 has been known. In this manufacturing method, from a material 1 roll in which a sheet product having an optical member is wound, the sheet product is unrolled up, a defect of the sheet product is detected, and then the sheet product is cut based on the detection result to be formed into each sheet product piece. Next, the releasing film thereon is peeled therefrom, and then the optical member is bonded onto a liquid crystal cell.

Known is also a manufacturing method of Patent Document 2. The manufacturing method is a method wherein: without cutting a releasing film in a sheet product, some other optical member (for example, a polarizing plate) therein is cut; this releasing film allows the continuity of the sheet product to be kept; and while this releasing film is peeled, one piece of the optical member is bonded onto an optical display unit (liquid crystal cell) through a pressure-sensitive adhesive interposed therebetween.

Patent Document 1: JP-A-2007-140046
Patent Document 2: JP-A-2005-37416

DISCLOSURE OF THE INVENTION

Problems to be Solved by the Invention

In a case where an optical member has defects such as scratches or stains, the adhesion of the member to a liquid crystal cell as it is to the member, causes a problem about the display quality of the optical display device. Thus, before an optical member is bonded onto a liquid crystal cell, a defect of the optical member is inspected.

In the case of Patent Document 1, an optical member therein is in the state of a sheet piece obtained by cutting all members of a long sheet product; therefore, a defect inspection thereof can easily be made. Additionally, the optical member judged as a defective member in the defect inspection can easily be excluded. In the meantime, in the case of a method of cutting, without cutting partial members (such as a releasing film) of a sheet product, the other members (the method may be referred to as half cut hereinafter) as in Patent Document 2, an optical member judged as a defective member is not easily excluded. In other words, cut optical members are present on a releasing film through a pressure-sensitive adhesive interposed therebetween, and further optical members each judged as a non-defective member are present to be adjacent to optical members each judged as a defective member; therefore, it is very difficult to remove only the optical members judged to be defective so that the members are not bonded onto a liquid crystal cell.

In light of the above-mentioned situation, the present invention has been made. An object thereof is to provide a manufacturing system of an optical display device in which the following can be attained in the case of bonding optical members to optical display units, respectively: an optical member to be excluded, which is, for example, an optical member judged as a defective member, can be appropriately excluded so that the optical member is not bonded onto any optical display unit and a manufacturing method of an optical display device.

Means for Solving the Problems

In order to solve the problems, the present inventors have made eager researches to make the following invention.

The present invention is a manufacturing system of an optical display device having an optical display unit and an optical member of a predetermined size bonded onto the optical display unit, the system includes:

a cutting device to cut an optical member without cutting a releasing film in along laminated optical product having the optical member and the releasing film laid on the optical member, and thereby form, on the releasing film, the optical member of the predetermined size to be bonded onto the optical display unit and an optical member to be excluded, a peeling device to peel the releasing film from the optical member of the predetermined size formed by the cutting device, a bonding device to bond the optical member of the predetermined size onto the optical display unit while or after the releasing film is peeled from the optical member of the predetermined size by the peeling device, and an excluding device having a pressure-sensitive adhesive surface and excluding, from the releasing film, the optical member to be excluded which is formed by the cutting device by allowing the optical member to be excluded to bond onto the pressure-sensitive adhesive surface.

According to this structure, the optical member to be excluded, which is cut by the cutting device, is appropriately excluded from the releasing film; thus, without bonding the member onto any optical display unit, only the optical member of the predetermined size can be appropriately bonded onto the optical display unit. The system may be made so as to read defect data (defect position coordinates) attached to an end region of the optical member or the releasing film (the reading is a function of a reading device) at the time of the exclusion, analyze the data, determine the position of a defect, and apply excluding treatment to the defect-containing optical member. The system may also be configured so as to read a defect mark attached to an end region of the optical member (the mark means that a defect is present from the position to which the mark is attached in the width direction of the film), and apply excluding treatment to the mark-containing optical member. The "pressure-sensitive adhesive surface" is, for example, a pressure-sensitive adhesive or a pressure-sensitive adhesive layer formed on a surface of each of a roll, a tape, a flat plate, a warped plate, or the like.

In the present invention, it is preferred that the excluding device has a rotatable roller for exclusion around which a pressure-sensitive adhesive tape is wound, and excludes, from the releasing film, the optical member to be excluded which is formed by the cutting device by allowing the optical member to be excluded to bond onto the pressure-sensitive adhesive surface.

In the present invention, it is also preferred that the system further includes an inspecting device to make a defect inspection of the laminated optical product, wherein the optical member of the predetermined size is a member judged as a non-defective member in the defect inspection by the inspecting device, and the optical member to be excluded is a member judged as a defective member in the defect inspection by the inspecting device.

In the case of making a defect inspection of, for example, the optical member obtained by peeling the releasing film from the laminated optical product, the defect inspection of the optical member can be favorably made without the necessity of considering a retardation inherent in the releasing film, and defects such as foreign substances or scratches bonding to or included in the releasing film. It is allowable to make a defect inspection of the optical member without peeling the releasing film from the laminated optical product. In this defect inspection, the kind and coordinates of a defect are detected as defect data, and based on the defect data, the optical member is judged as a non-defective member or a defective member.

The cutting device has a structure in which the long laminated optical product is cut into a predetermined size which is beforehand set. When a defect judged as a defective product is included in the predetermined size, the optical member is cut at positions which contain the defect and are apart from the position of the defect by a predetermined distance (the distance is set to, for example, about 50 mm, which gives a margin for the cutting positions). In other words, the optical product is cut into the predetermined size to avoid the optical member containing the defect. This cutting method is called "skip cut". The optical member containing the defect, which is judged as a defective product, is excluded by the excluding device. In this manner, the yield of optical display devices is largely improved.

In the present invention, it is also preferred that the excluding device excludes, from the releasing film, the optical member to be excluded, by allowing a surface of the optical member to be excluded, the surface being opposite to the optical member surface onto which the releasing film is bonded, to bond onto the pressure-sensitive adhesive surface of the pressure-sensitive adhesive tape.

According to this structure, when the surface of the optical member to be excluded that is opposite to the optical member surface onto which the releasing film is bonded is bonded onto the pressure-sensitive adhesive surface of the pressure-sensitive adhesive tape (for example, a pressure-sensitive adhesive tape having adhesive strength stronger than the force for peeling the optical member and the releasing film from each other) to exclude the optical member to be excluded, the optical member to be excluded can be appropriately excluded without interrupting the treatment by means of the bonding device for bonding the optical display unit and the optical member onto each other, nor setting an accumulating mechanism between the excluding device and the bonding device.

In the present invention, it is also preferred that the excluding device excludes the optical member to be excluded at an upstream position relative to the bonding device in the course of carrying the laminated optical product.

According to this structure, it is unnecessary to interrupt the bonding treatment by the bonding device. When the excluding treatment is frequently conducted, the productivity is favorably made particularly better. The productivity is largely affected by a time loss based on a matter that the excluding treatment by the excluding device and the bonding treatment by the bonding device are conducted in the same space; thus, when the matter is removed, the productivity is largely improved.

In the present invention, it is also preferred that the excluding device excludes the optical member to be excluded by pressing the pressure-sensitive adhesive surface of the pressure-sensitive adhesive tape wound around the roller for exclusion, onto the optical member to be excluded, at a roll member of a carrying means for carrying the laminated optical product and thereby allowing the optical member to be excluded to bond onto the pressure-sensitive adhesive tape.

According to this structure, the pressure-sensitive adhesive surface of the pressure-sensitive adhesive tape, which is wound around the roller for exclusion, is pressed onto the optical member to be excluded that is positioned at the roll member of the carrying means, thereby bonding the optical member to be excluded onto the pressure-sensitive adhesive tape so that the optical member to be excluded can be appropriately excluded. Without using any peeling means for peeling the releasing film, the optical member to be excluded can be appropriately excluded. Thus, the structure is preferred. The roll member may be comprised of a single roller, or a plurality of rollers. By means of the roll member of the carrying means, an upstream member thereof, and a downstream member thereof, the carrying direction of the laminated optical member wound around the roll member is changed preferably by less than 180°, more preferably by 120°, even more preferably by a value in the range of 90 to 60° in a state where the releasing film of the laminated optical product is faced inwards.

The manufacturing method of an optical display device according to another aspect of the present invention is a manufacturing method of an optical display device an optical display unit and an optical member of a predetermined size bonded onto the optical display unit, the method includes:

a cutting step of cutting an optical member without cutting a releasing film in a long laminated optical product having the optical member and the releasing film laid on the optical member, and thereby forming, on the releasing film, the optical member of the predetermined size to be bonded onto the optical display unit and an optical member to be excluded, a peeling step of peeling the releasing film from the optical member of the predetermined size formed through the cutting step, a bonding step of bonding the optical member of the predetermined size onto the optical display unit while or after the releasing film is peeled from the optical member of the predetermined size in the peeling step, and an excluding step of excluding, from the releasing film, the optical member to be excluded by allowing the optical member to be excluded which is formed in the cutting step to bond onto a pressure-sensitive adhesive surface.

Effects and advantages of this structure are as described above.

Another embodiment has a structure in which the bonding device has a rotatable pushing roller for pressing the optical member toward the optical unit, and by means of the pushing roller, the optical member to be excluded from which the releasing film is peeled is pressed onto the surface of the tape member wound around the roller for exclusion, thereby bonding the optical member to be excluded onto the tape member to be excluded. The tape member may be a tape on which a pressure-sensitive adhesive is formed, and may be a simple tape. The size, the thickness, the material and the like of the tape are not particularly limited. Examples of the tape include various plastic tapes. The tape is preferably comprised of a material capable of being appropriately bonded onto the pressure-sensitive adhesive between the optical member and the releasing film.

According to this structure, by means of the pushing roller of the bonding device, the pressure-sensitive adhesive layer of the optical member to be excluded from which the releasing film is peeled is pressed onto the surface of the tape member wound around the roller for exclusion, thereby bonding the optical member to be excluded onto the tape member through the pressure-sensitive adhesive layer of the optical member so that the optical member can be favorably excluded. The excluding device is located near the bonding device to make use of a partial function of the bonding device. Thus, the excluding device can be made compact. In this point, the structure is preferred.

The tape member may be a tape on which a pressure-sensitive adhesive is formed, and may be a simple tape. The size, the thickness, the material and the like of the tape are not particularly limited. Examples of the tape include various plastic tapes. The tape is preferably comprised of a material capable of being appropriately bonded onto the pressure-sensitive adhesive between the optical member and the releasing film. The use of a tape as the tape member can favorably make costs far lower and make the handling of the member in the use simpler than that of a pressure-sensitive adhesive tape.

In still another embodiment, the excluding device has a peeling means to peel the releasing film from the optical member to be excluded, and a pushing roller for exclusion to press the optical member to be excluded, from which the releasing film is peeled by the peeling means, toward the roller for exclusion, wherein by means of the pushing roller for exclusion, the pressure-sensitive adhesive layer of the optical member to be excluded, from which the releasing film is peeled, is pressed onto the surface of the tape member wound around the roller for exclusion, thereby bonding the optical member to be excluded onto the tape member to be excluded.

According to this structure, the pushing roller for exclusion makes it possible to press the pressure-sensitive adhesive layer of the optical member to be excluded, from which the releasing film is peeled, onto the surface of the tape member wound around the roller for exclusion, thereby bonding the optical member to be excluded onto the tape member to be appropriately excluded.

The optical display device of the present invention is, for example, a liquid crystal display device, or an organic EL display device. The liquid crystal display device has, as its optical display unit, a liquid crystal cell. The organic EL display device has, as its optical display unit, an organic EL cell.

In the present invention, a defect means, for example, a stain, a scratch, an especial defect in a bruise form, as is twisted, in which a foreign substance is nipped (the defect may be referred as knick), an air bubble, or a foreign substance on a surface of an object or the inside thereof.

DESCRIPTION OF REFERENCE NUMBERS OR SYMBOLS

Figure 1:
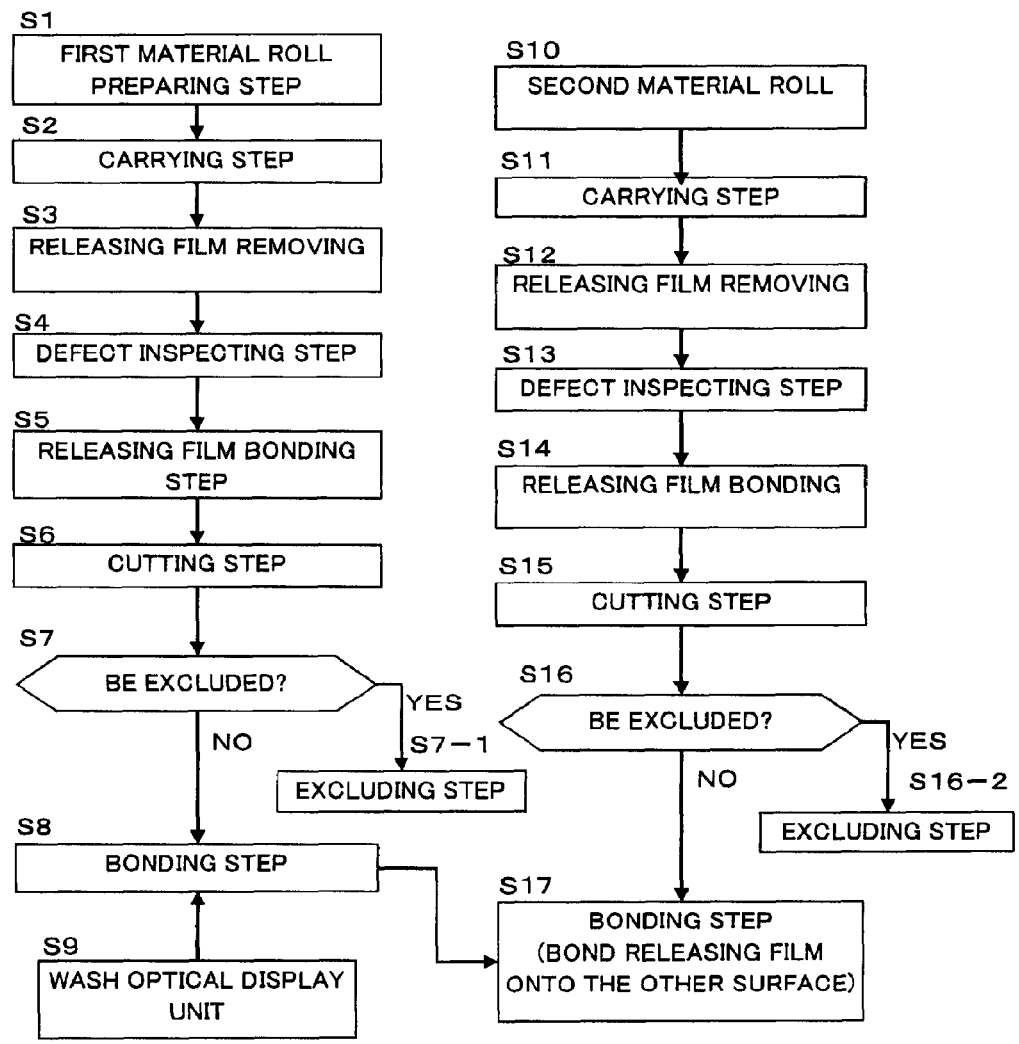
FIG. 1 A flowchart of a manufacturing method of an optical display device.

F1 first sheet product
F2 second sheet product
F11 first optical member
F11a first polarizer
F11b first polarizer protecting film
F11c second polarizer protecting film
F12 first releasing film
F13 surface protecting member
F14 first weak pressure-sensitive adhesive layer
F15 first pressure-sensitive adhesive layer
F21 second optical member
F21a second polarizer
F21b third polarizer protecting film
F21c fourth polarizer protecting film
F22 second releasing film
F23 surface protecting film
F24 second weak pressure-sensitive adhesive layer
F25 second pressure-sensitive adhesive layer
R carrying means
W optical display unit
W12 optical display device
1 controlling device
10 polishing and washing device
11 water washing device
13 first pre-inspection peeling device
14 first defect inspecting device
15 first releasing film bonding device 16 first cutting device
17 first peeling device
18 first bonding device
19 first excluding device
192 roller for exclusion
194 pushing roller for exclusion
22 second carrying device
23 second pre-inspection peeling device
24 second defect inspecting device
25 second releasing film bonding device
26 second cutting device
27 second peeling device
28 second bonding device
29 second excluding device
292 roller for exclusion
294 pushing roller for exclusion

BEST MODE FOR CARRYING OUT THE INVENTION

Embodiment 1

Figure 2:
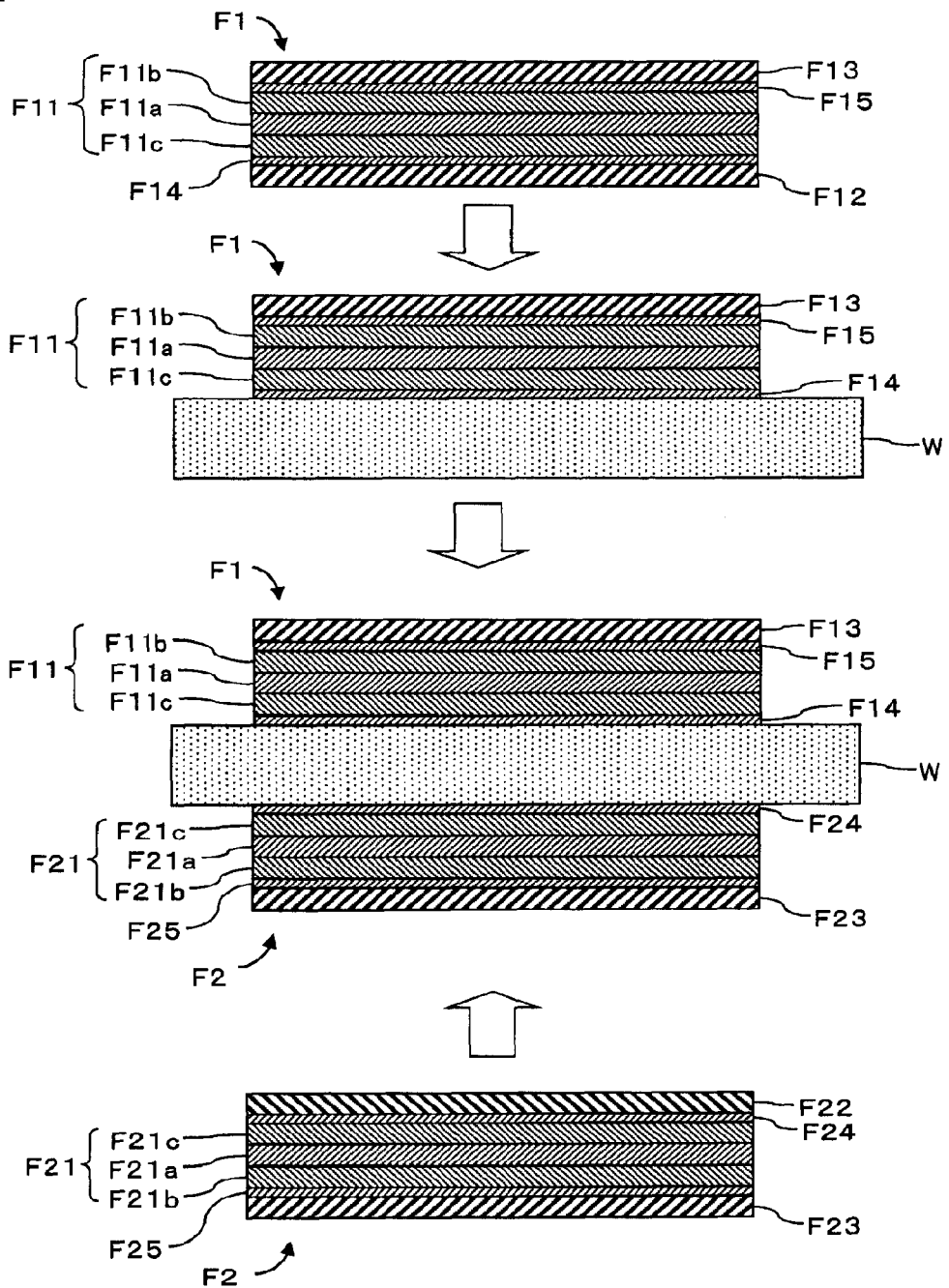
FIG. 2 A view illustrating an example of a laminated structure of an optical member, a laminated optical member, and an optical display unit.
Figure 3:
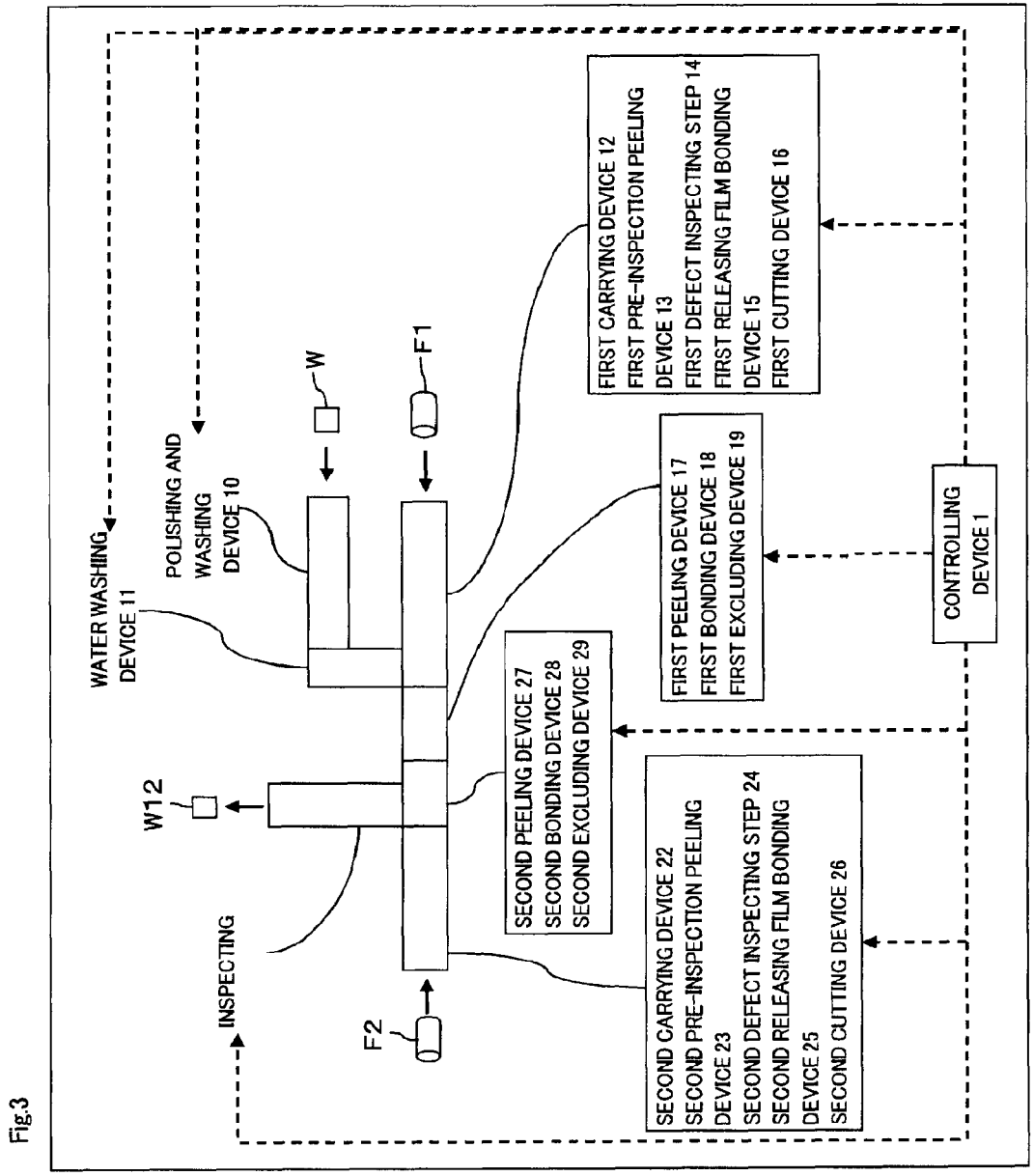
FIG. 3 A view for explaining a device structure of a manufacturing system.

Embodiment 1 of the present invention will be described hereinafter. FIG. 1 shows a flow chart of a manufacturing method of an optical display device. FIG. 2 shows a schematic view of a sectional structure of first and second laminated optical products F1 and F2, first and second optical members F11 and F22, and a liquid crystal cell W (optical display unit). FIG. 3 shows an example of an arrangement plan view of a manufacturing system of an optical display device in Embodiment 1 of FIG. 1. FIGS. 4 to 10C are each a view for explaining an example of the manufacturing system of an optical display device in Embodiment 1. Embodiment 1 may have a structure of excluding an optical member judged to contain a defect at a position where the optical member is bonded onto an optical display unit, or may have a structure of excluding the optical member at the upstream side relative to the bonding position. For example, a case where an optical member is excluded for the purpose of sampling for process-inspection, sampling for quality-inspection, or the like is also illustrated, as well as a case where an optical member judged to contain a defect is excluded.

(Optical Member and Laminated Optical Product)

Examples of the optical member, which is bonded onto the optical display unit, include a polarizer film, a retardation film, a viewing angle compensating film and a brightness enhancement film; and any combination of two or more of these films. A transparent film for protection may be laminated on one surface or both surfaces of any one of these optical members. Hereinafter, the structure of the first laminated optical product F1 will be described. The second laminated optical product F2 also has the same structure. The structure of the first laminated optical product F1 may be different from that of the second laminated optical product F2.

As illustrated in FIG. 2, the first laminated optical product F1 has a laminated structure having a first optical member F11, a releasing film F12, and a surface protecting member F13. The first optical member F11 is comprised of a first polarizer F11a, a first polarizer protecting film F11b on one surface thereof through an adhesive layer (not illustrated) interposed therebetween, and a second polarizer protecting film F11c on the other surface thereof through an adhesive layer (not illustrated) interposed therebetween. Hereinafter, a laminated structure comprised of a polarizer and a polarizer protecting film may be referred as a polarizing plate.

The first and second polarizer protecting films F11b and F11c may each be, for example, a triacetylcellulose (TAC) film or a polyethylene terephthalate (PET) film. The surface protecting film F13 is laid on the first polarizer protecting film F11b through a weak pressure-sensitive adhesive layer F15 interposed therebetween. The releasing film F12 is laid on the second polarizer protecting film F11c through a pressure-sensitive adhesive layer F14 interposed therebetween. The first and second polarizer protecting films F11b and F11c are not particularly limited, and are each comprised of, for example, a film whose material is a thermoplastic resin excellent in transparency, mechanical strength, thermal stability, water blocking property, isotropy and the like. Specific examples of the thermoplastic resin include cellulose resins such as triacetylcellulose, polyester resin, polyethersulfone resin, polysulfone resin, polycarbonate resin, polyamide resin, polyimide resin, polyolefin resin, (meth)acrylic resin, cyclic polyolefin resin (norbornene based resin), polyarylate resin, polystyrene resin, and polyvinyl alcohol resin; and mixtures thereof.

An example of the first optical member F11 is an optical film having a multi-layer laminated structure in which various optical layers are laminated onto each other when the layers are practically used. The optical layers are not particularly limited. An example thereof is a method of applying a hard coating treatment, antireflective treatment or a surface treatment for prevention of sticking, or for diffusion or antiglare to a surface of the polarizer protecting film on which the polarizer is not bonded (a surface on which no adhesive coating layer is laid), or laminating an aligned liquid crystal layer for viewing angle compensation, or the like onto the surface; or a member in which one or more of the following are laminated onto the surface: a reflector, a semi-transmissive plate, a retardation plate (including such as a ½ or ¼ wavelength plate (λ plate)), or an optical film used to form a liquid crystal display device or the like, such as a viewing angle compensating film.

The first polarizer F11a is comprised of, for example, a polyvinyl alcohol based film.

The releasing film F12 is temporarily bonded onto an uncovered surface of the first pressure-sensitive adhesive layer F14 in order to prevent the surface from being polluted, or the like. This makes it possible to prevent the pressure-sensitive adhesive layer F14 from being contacted when the laminated product is in an ordinarily-handled state. The releasing film F12 may be an appropriate film according to prior art, for example, an appropriate thin sheet piece which is optionally subjected to coating treatment with an appropriate peeling agent, such as a silicone based, long-chain alkyl based or fluorine-contained peeling agent, or molybdenum sulfite; examples of the sheet piece include a plastic film, a rubber sheet, a paper piece, a nonwoven cloth, a net, a foamed sheet and a metallic foil piece, and any laminated product thereof.

The surface protecting member F13 is formed through the weak pressure-sensitive adhesive layer F15. A main purpose thereof is the prevention of a scratch or a stain, or the like. The surface protecting member may be, for example, an appropriate member according to prior art, for example, an appropriate thin sheet piece which is optionally subjected to coating treatment with an appropriate peeling agent, such as a silicone based, long-chain alkyl based or fluorine-contained peeling agent, or molybdenum sulfite; examples of the sheet piece include a plastic film, a rubber sheet, a paper piece, a nonwoven cloth, a net, a foamed sheet and a metallic foil piece, and any laminated product thereof.

The pressure-sensitive adhesive layer F14 and the weak pressure-sensitive adhesive layer F15 are laid in order to attain bonding with other members such as a liquid crystal cell. The pressure-sensitive adhesive which constitutes the pressure-sensitive adhesive layer F14 and the weak pressure-sensitive adhesive layer F15, respectively, are not particularly limited, and each of the layers may be formed by an appropriate pressure-sensitive adhesive according to the prior art, such as an acrylic pressure-sensitive adhesive.

(Manufacturing Method of Optical Display Device, and Manufacturing System Thereof)

Individual steps and individual device treatment operations described below are performed in an isolating structure 50 isolated from the inside of a factory. The isolating structure 50 is comprised of walls made of a transparent material, and a framework structure. Blowers 40 are set to the ceiling of the isolating structure 50. The blowers 40 are each equipped with an HEPA filter so that highly clean air is sent into the division wall structure 50 to generate a flow of the clean air. Air discharging openings 50a are made in the wall surface underneath of the division wall structure 50 in order to discharge the air therein to the outside. Filters may also be set to the planes of the openings to prevent invading materials from the outside. The division wall structure 50 and the blowers 40 make it possible to maintain a clean environment of the whole of the manufacturing system and appropriately prevent the contamination of foreign substances from the outside. It is unnecessary to render the whole of the factory a clean room since only the manufacturing system is isolated from the outside by the division wall structure 50.

(Manufacturing Flowchart)

(1) First material roll preparing step (S1): The first laminated optical product F1, which is a long product, is prepared as a first material roll. The width of the first material roll depends on the adhesion size of an optical display unit.

(2) Carrying step (S2): The prepared first material roll is set, and from the set material roll, the first laminated optical product F1 is unrolled and then carried at the downstream side. A first carrying device 12 for carrying the first laminated optical product F1 is comprised of, for example, a pair of nip rollers, tension rollers, a rotation driving device, an accumulating device A, a sensor device, a controlling device and the like (see FIG. 4).

(3) Releasing film removing step (S3): A first pre-inspection peeling device 13 illustrated in FIG. 4 peels the releasing film F12 from the first laminated optical product F1 which is being carried. The first pre-inspection peeling device 13 has a structure in which from the carried first laminated optical product F1, the releasing film F12 is wound around a knife edge region of a peeling mechanism 131 to be peeled, and then the peeled releasing film F12 is wound up around a roll 132.

(4) Defect inspecting step (S4): After the releasing film removing step (S3), a first defect inspecting device 14 illustrated in FIG. 4 inspects defects of the first laminated optical product F1. Without considering a retardation inherent in the releasing film F12, the defect inspection of the first optical member F11 can be made. Examples of the method for the defect inspection used herein include a method of applying image-photographing and image-processing to both surfaces of the first laminated optical product F1 through transmissible light or reflective light; a method of arranging, between a CCD camera and an inspecting target, a polarizing film for inspection so as to be in a crossed Nichol state between the film and the polarization axis of the polarizing plate, which is the inspecting target (the arrangement may be referred to as 0-degree cross), and then applying image-photographing and image-processing thereto; and a method of arranging, between a CCD camera and an inspecting target, a polarizing film for inspection so as to give a predetermined angle (for example, an angle in a range more than 0 degree and not more than 10 degrees) between the film and the polarization axis of the polarizing plate, which is the inspecting target (the arrangement may be referred to as x-degree cross), and then applying image-photographing and image-processing thereto.

The defect data obtained in the first defect inspecting device 14 are tied to positional data (for example, position coordinates) thereof, and transmitted to the controlling device so that the data can contribute to a cutting method through a first cutting device 16, which will be described later.

The defect-containing first laminated optical product F1 is configured to be excluded by a first excluding device 19, which will be described later, so as not to be bonded onto any optical display unit W.

(5) Releasing film bonding step (S5): After the defect inspecting step (S4), a first releasing film bonding device 15 illustrated in FIG. 4 adheres the releasing film F12a onto the first optical member F11 through the first pressure-sensitive adhesive layer F14 interposed therebetween.

Figure 4:
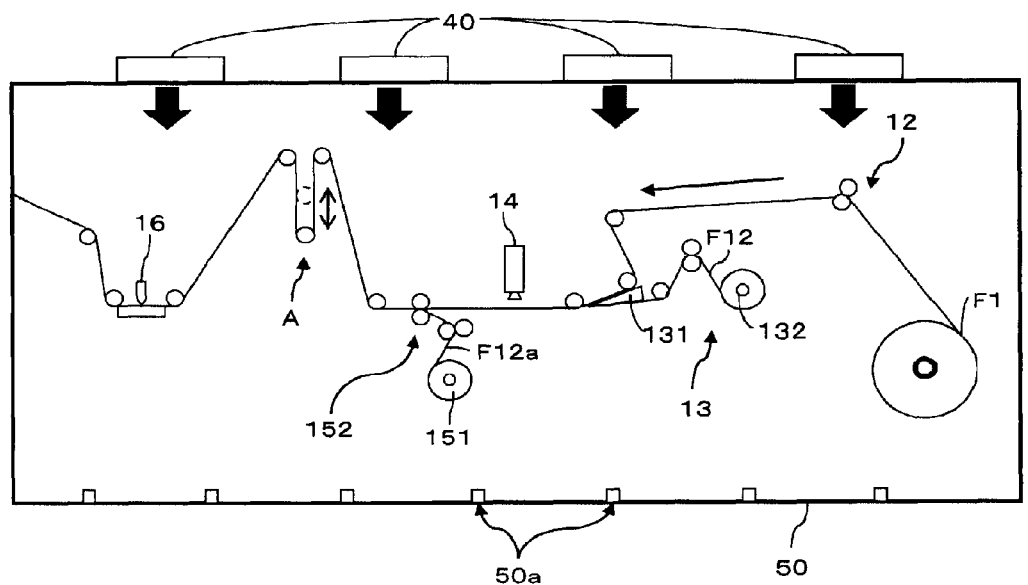
FIG. 4 A view for explaining a device structure of the manufacturing system.

After the defect inspecting step (S4), the first releasing film bonding device 15 adheres the releasing film F12a onto the first optical member F11 through the first pressure-sensitive adhesive layer F14 interposed therebetween. As illustrated in FIG. 4, the releasing film F12a is unrolled from a material roll 151 of the releasing film F12a, and then the releasing film F12a and the first laminated optical product F1 are sandwiched between one or more roll pairs 152. The roller pair(s) 152 allow(s) predetermined pressure to act thereon, thereby bonding the releasing film. F12a onto the first optical member F11 through the first pressure-sensitive adhesive layer F14 interposed therebetween.

(6) Cutting step (S6): After the releasing film bonding step (S5), a first cutting device 16 illustrated in FIG. 4 cuts the surface protecting member 13, the weak pressure-sensitive adhesive layer 15, the first optical member 11 and the first pressure-sensitive adhesive layer F14 without cutting the releasing film 12a. It is preferred that the first cutting device 16 cuts the laminate into a predetermined size based on the position coordinates of the defects detected in the first defect inspecting treatment to avoid defect regions. The method for the cutting is, for example, laser cutting, cutter cutting, or some other known cutting method. The device is configured to cut the laminate to avoid the defects based on the defect data obtained by the first defect inspecting device 14. In this way, the yield of the first laminated optical products F1 is largely improved. A defect-containing first laminated optical product F1 out of the first laminated optical products F1 is configured to be excluded by a first excluding device 19, which will be described later, so as not to be bonded onto any optical display unit W.

(7) Non-defective product judgment (FIG. 1, S7): From the results of the defect inspection based on the first defect inspecting device 14, it is judged whether the products are each a non-defective product or not. The judgment criterion for the non-defective product judgment is beforehand set. For example, the judgment is made in accordance with the number of the detects per predetermined area, the size of the defects, and the kind of the defects. The non-defective product judgment is made severer as the display performance for higher precision is required.

Figure 5A:
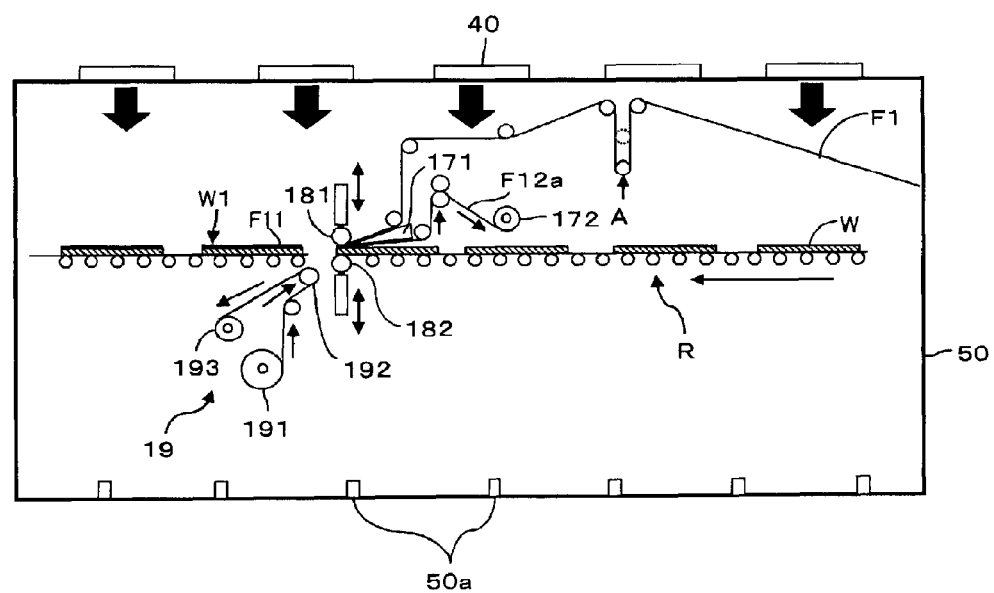
FIG. 5A A view for explaining a device structure of the manufacturing system.
Figure 5B:
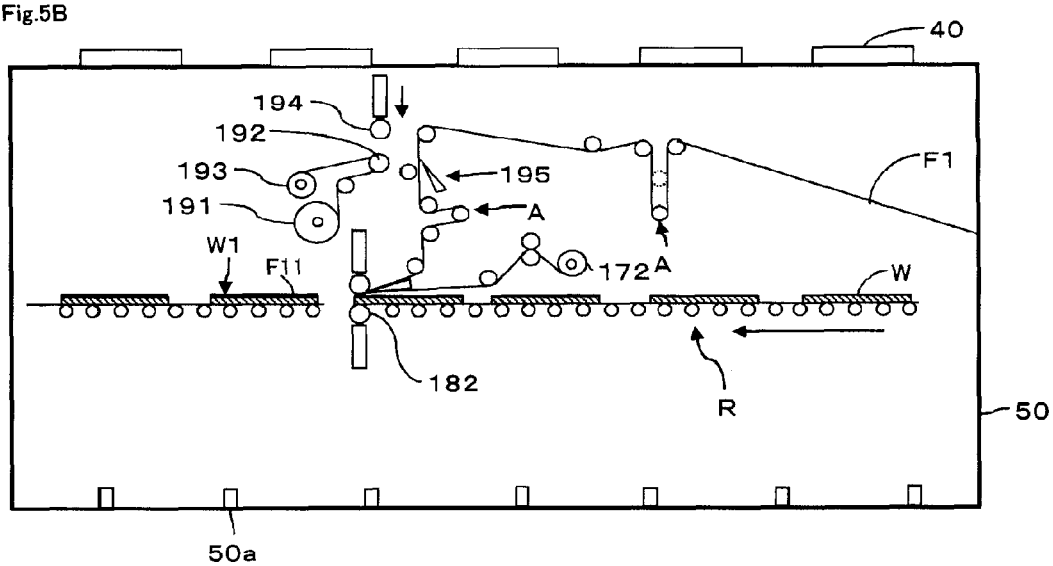
FIG. 5B A view for explaining a device structure of the manufacturing system.
Figure 5C:
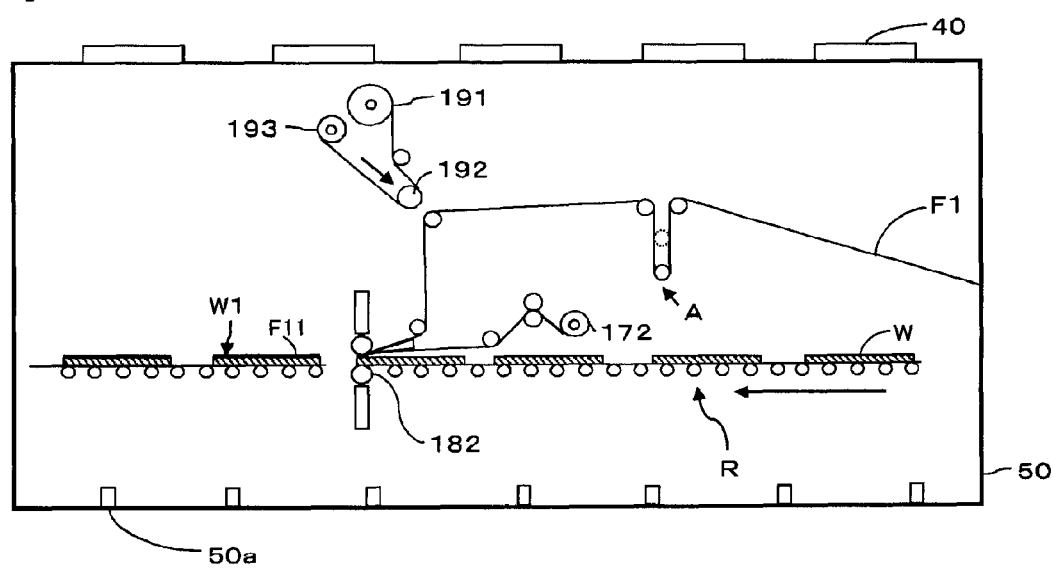
FIG. 5C A view for explaining a device structure of the manufacturing system.
Figure 6:
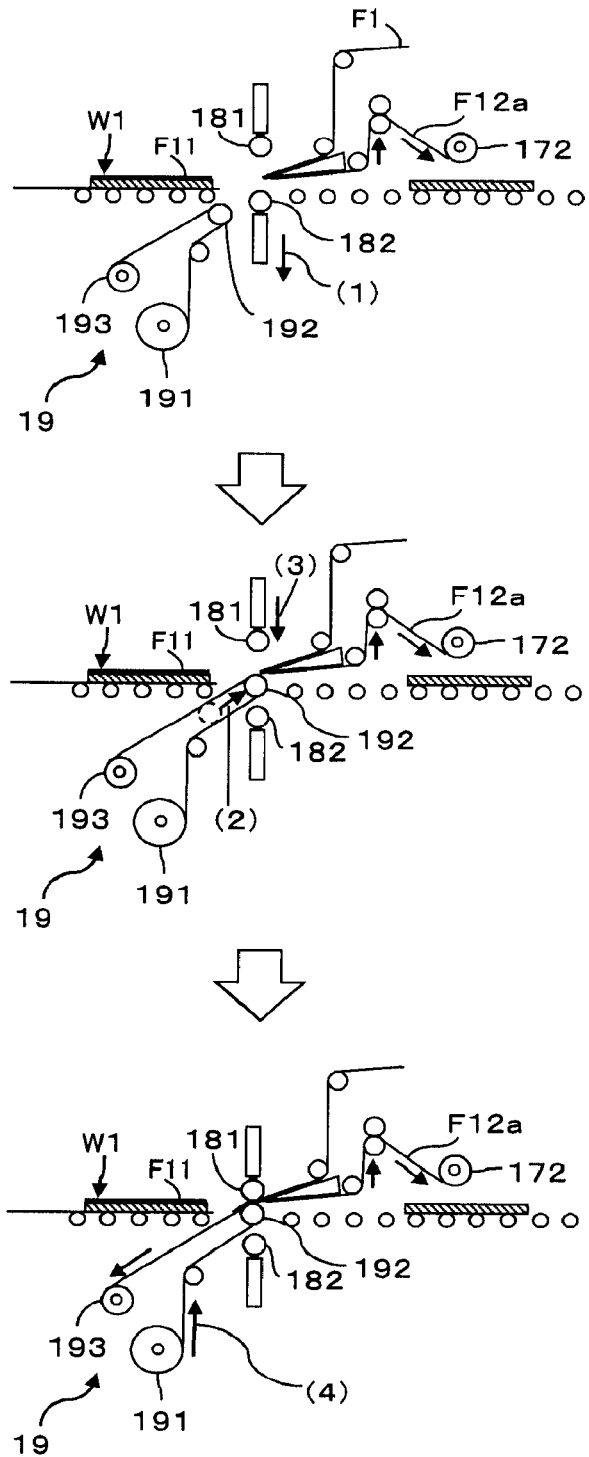
FIG. 6 A view for explaining a device structure of the manufacturing system.
Figure 7:
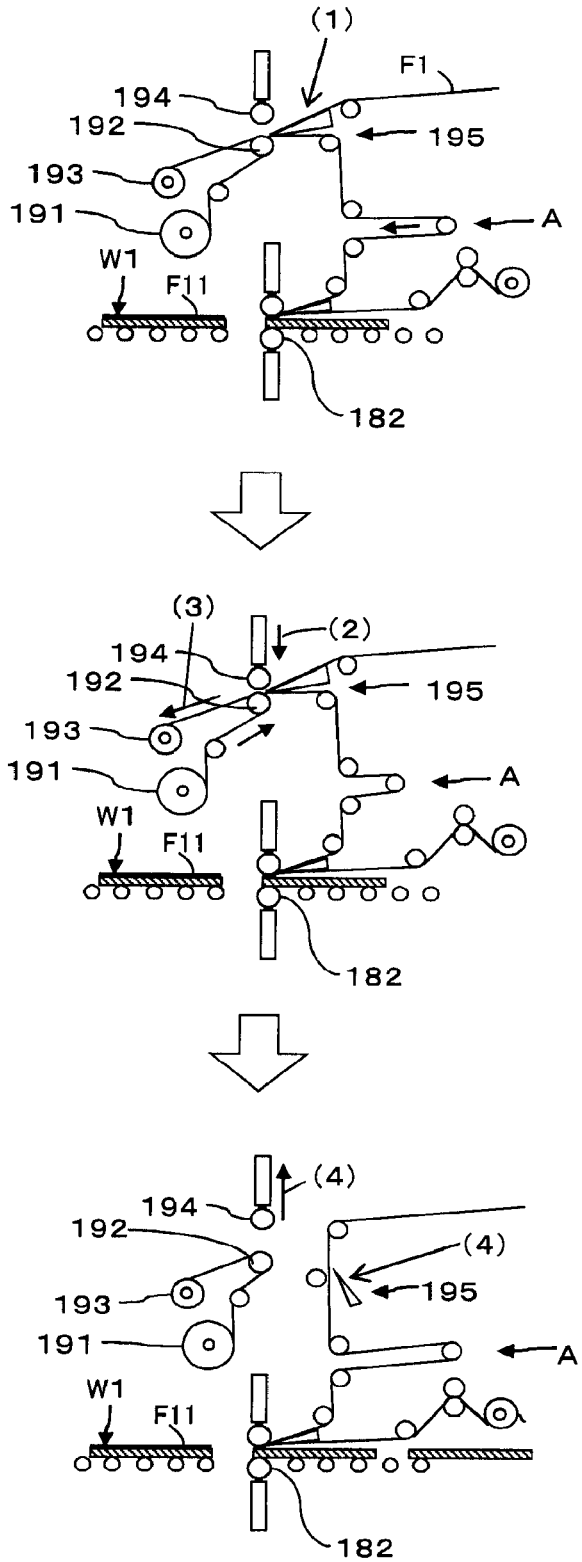
FIG. 7 A view for explaining a device structure of the manufacturing system.
Figure 8:
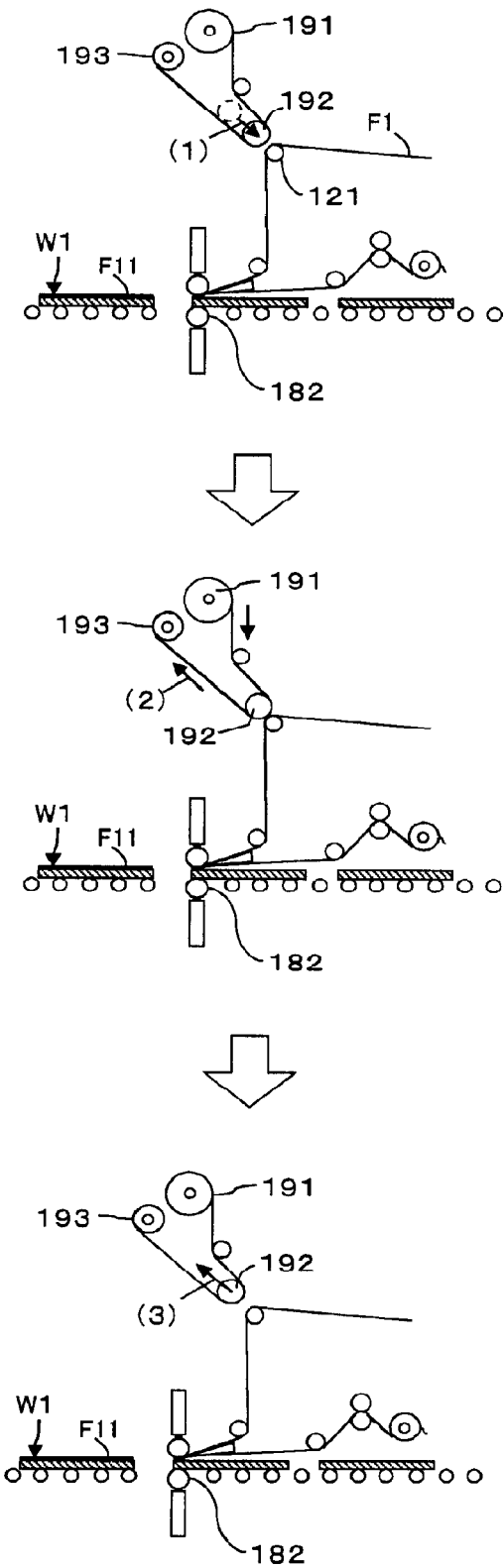
FIG. 8 A view for explaining a device structure of the manufacturing system.
Figure 9:
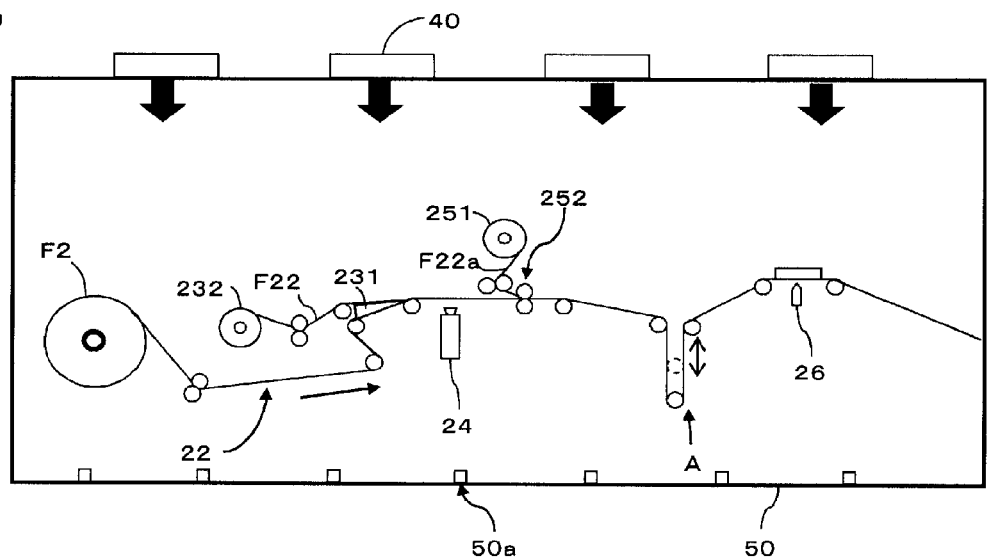
FIG. 9 A view for explaining a device structure of the manufacturing system.

(7-1) Excluding step (FIG. 1, S7-1): The first optical member F11 judged to be non-defective in the defect inspection is subjected to excluding treatment (FIGS. 5A to 5C). Structural Examples of the excluding treatment will be described later.

(8) Bonding step (S8): Any one of the optical members is subjected to bonding treatment as far as the optical member is not to be excluded. While the releasing film F12a is peeled by a first peeling device 17, a first bonding device 18 adheres the first optical member F11, from which the releasing film F12a has been peeled, onto an optical display unit W through the first pressure-sensitive adhesive layer F14 interposed therebetween (see FIG. 5A).

A peeling mechanism 171 of the first peeling device has a knife edge region having a sharp tip, and is configured in such a manner that the releasing film. F12a is wound around this knife edge region to be transferred reversely, whereby the releasing film F12a is peeled and additionally the first laminated optical product F1 after the releasing film F12a is peeled is sent onto a surface of the optical display unit W. The peeled releasing film F12a is wound up around a roll 172.

As illustrated in FIG. 5A, in the case of the bonding treatment, a pushing roller 181 is brought into contact with a surface of the surface protecting member F13, and a guide roller 182 is brought into contact with the lower surface of the optical display unit W to press the first laminated optical product F1 onto the optical display unit W surface, thereby bonding the uncovered bonding-surface of the first optical member F11 (the surface of the first pressure-sensitive adhesive layer F14, from which the releasing film F12a has been peeled, onto the optical display unit W surface. The pushing roller 181 and the guide roller 182 may each be an elastic roller (made of, for example, a silicone rubber), or a roller made of metal.

(9) Optical display unit washing step (S9): The front surface of the optical display unit W is beforehand washed by a polishing and washing device and a water washing device. The washed optical display unit W is carried up to a first bonding device by a carrying means R. The carrying means R is comprised of, for example, a plurality of carrying rollers, a mechanism for switching the carrying direction, a rotation driving device, a sensor device, a controlling device, and the like.

Through the above-mentioned steps, the first optical member F11 is bonded onto one of the surfaces of the optical display unit W. The following will describe a manufacturing step of bonding a second optical member F21 onto the other surface with reference to FIGS. 9, and 10A to 10C. The same steps as in the above-mentioned manufacturing step may be briefly described.

(10) Second material roll preparing step (S10): The second laminated optical product F2, which is a long product, is prepared as a second material roll. The laminated structure of the second laminated optical product F2 has a structure as illustrated in FIG. 2. The second laminated optical product F2 has a second optical member F21, a releasing film F22, and a surface protecting member F23. The second optical member F21 is comprised of a second polarizer F21a, a third polarizer protecting film F21b on one of the surfaces thereof through an adhesive layer (not illustrated) interposed therebetween, and a fourth polarizer protecting film F21c on the other surface thereof through an adhesive layer (not illustrated) interposed therebetween.

(11) Carrying step (S11): The prepared second material roll is set, and from the set material roll, the second laminated optical product F2 is unrolled and then carried at the downstream side. A second carrying device 22 illustrated in FIG. 9 for carrying the second laminated optical product F2 has the same structure as the first carrying device 12. However, the carrying direction of the second laminated optical product F2 is configured to reverse to the carrying direction of the first laminated optical product F1, and further the product F2 is carried to direct the surface of the releasing film F22 upward.

(12) Releasing film removing step (S12): A second pre-inspection peeling device illustrated in FIG. 9 peels the releasing film F22 from the second laminated optical product F2 which is being carried. Its peeling mechanism is similar to the above-mentioned peeling mechanism. The second pre-inspection peeling device is configured in such a manner that the releasing film. F22 is wound around a knife edge region of a peeling mechanism 231 to be peeled, and then this peeled releasing film F22 is wound up around a roll 232.

(13) Defect inspecting step (S13): After the releasing film removing step (S11), a second defect inspecting device 24 illustrated in FIG. 9 inspects the defects of the second laminated optical product F2. The structure of the second defect inspecting device 24 is similar to that of the first defect inspecting device 14.

(14) Releasing film bonding step (S14): After the second defect inspecting step (S12), a second releasing film bonding device 25 illustrated in FIG. 9 adheres the releasing film F22a onto the second optical member F21 through a second pressure-sensitive adhesive layer F24 interposed therebetween. As illustrated in FIG. 4, in the second releasing film bonding device 25, the releasing film F22a is unrolled from a material roll 251 of the releasing film F22a, and then the releasing film F22a and the second laminated optical product F2 are sandwiched between one or more roll pairs 252, thereby bonding the releasing film F22a onto the second optical member F21 through the second pressure-sensitive adhesive layer F24 interposed therebetween.

(15) Cutting step (S15): After the releasing film bonding step (S14), a second cutting device 26 illustrated in FIG. 9 cuts the surface protecting member F23, a weak pressure-sensitive adhesive layer F25, the second optical member F21 and the second pressure-sensitive adhesive layer F24 without cutting the releasing film 22a. The structure of the second cutting device 26 is similar to that of the first cutting device 16.

(16) Non-defective product judgment (S16): From the results of the defect inspection based on the second defect inspecting device 24, it is judged whether the products are each a non-defective product or not. The judgment criterion for the non-defective product judgment is beforehand set. For example, the judgment is made in accordance with the number of the detects per predetermined area, the size of the defects, and the kind of the defects. The non-defective product judgment is made severer as the display performance for higher precision is required.

(16-1) Second optical film excluding step (S16-2): The second optical member F21 judged to be non-defective in the defect inspection is subjected to excluding treatment. Structural examples of the excluding treatment will be described later.

Figure 10A:
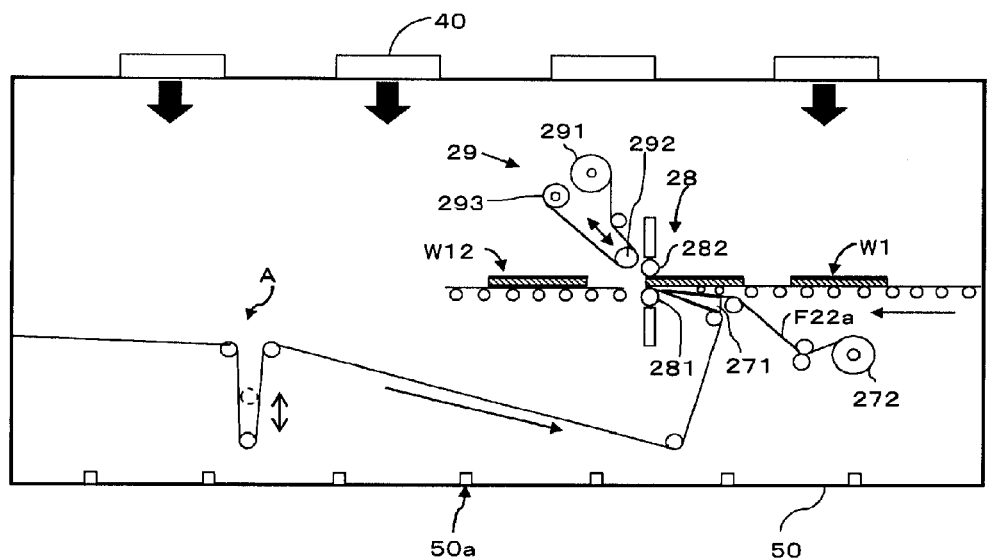
FIG. 10A A view for explaining a device structure of the manufacturing system.

(17) Bonding step (S17): Any one of the second optical members is subjected to bonding treatment as far as the optical member is judged to be non-defective. As illustrated in FIG. 10A, a second peeling device 27 is used to peel the second releasing film F22a (peeling step) while a second bonding device 28 is used to adhere the second optical member F21, from which the second releasing film F22 has been peeled, onto an optical display unit W1 through the second pressure-sensitive adhesive layer F24 interposed therebetween. In some cases, before the second optical member F21 is bonded onto the optical display unit W1, the optical display unit W1 is rotated by 90 degrees by means of a carrying direction switching mechanism of a carrying mechanism R to make the polarizer of the first optical member F11 and that of the second optical member F21 into a crossed Nichol relationship.

A peeling mechanism 271 of the second peeling device has a knife edge region having a sharp tip, and is configured in such a manner that the releasing film. F22a is wound around this knife edge region to be transferred reversely, whereby the releasing film F22a is peeled and additionally the second laminated optical product F2 after the releasing film F22a is peeled is sent onto a surface of the optical display unit W1. The peeled releasing film F22a is wound up around a roll 272.

As illustrated in FIG. 10A, in the case of the bonding treatment, a pushing roller 281 is brought into contact with a surface of the surface protecting member F23, and a guide roller 282 is brought into contact with the upper surface of the optical display unit W1 to press the second laminated optical product F2 onto the optical display unit W1 surface, thereby bonding the uncovered bonding-surface of the second optical member F21 (the surface of the second pressure-sensitive adhesive layer F24), from which the releasing film has been peeled, onto the optical display unit W1 surface.

Step of inspecting an optical display device W12: An inspecting device 30 inspects an optical display device W12 having both surfaces on which the optical members are bonded, respectively. The method for the inspection is, for example, a method of applying image-photographing and image-processing to both the surfaces of the optical display device W12 through reflective right. Another example thereof is a method of setting a polarizing film for inspection between a CCD camera and an inspection target. The algorithm for the image-processing may be a known manner. For example, defects can be detected by, for example, gray-scale decision based on binary image processing.

Based on the defect data obtained by the inspecting device 30, it is judged whether the optical display device W12 is a non-defective product or not. When the optical display device W12 is judged to be non-defective, the display device W12 is carried to the next mounting step. When the display device W12 is judged to be defective, the display device is subjected to reworking treatment to adhere an optical film thereon newly. Next, the resultant product is inspected. When the product is judged as a non-defective product, the product is carried to the mounting step. When the product is judged as a defective product, the product is again subjected to reworking treatment or disposal treatment.

By carrying out, in a series of the above-mentioned manufacturing steps, the bonding step for the first optical member F11 and the bonding step for the second optical member F21 in a continuous manufacturing line, an optical display device can be favorably manufactured. When the above-mentioned individual steps are particularly performed inside an isolating structure isolated from any factory, optical members can be bonded onto an optical display unit in an environment where cleanness is kept, so that a high-quality optical display device can be manufactured.

(Excluding Device)

FIGS. 5A to 5C and FIGS. 7 to 9 are views for explaining structural examples of the excluding device. The structure of the first excluding device 19 is not limited to structures given herein as examples. Various modifications of these structures may be used, and the modifications are included in the technical scope of the present invention.

Example 1 of Excluding Device

The first excluding device 19 for excluding the first laminated optical product F1 is described. The action of the first excluding device 19 illustrated in FIG. 5A is described with reference to FIG. 6. Example 1 of the first excluding device 19 has a structure in which the optical member F1 to be excluded is excluded at a position where the optical display unit W and the optical member F11 are bonded onto each other. A roller 192 for exclusion may be an elastic roller (made of, for example, silicone rubber), or may be a roller made of metal.

(1) When the optical member F11 to be excluded is carried to the bonding position, the carrying of the optical display unit W is stopped (the carrying mechanism R is equipped with an accumulating mechanism). The guide roller 182 is shifted vertically and downward.

(2) Next, the roller 182 for exclusion, around which a tape 191 is wound, is shifted to the bonding position, which is the position where the guide roller 182 is fixed.

(3) The pushing roller 181 is shifted vertically and downward.

(4) The pushing roller 181 pushes, toward the roller 192 for exclusion, the pressure-sensitive adhesive layer F14 surface of the optical member F11 to be excluded, from which the releasing film F12a has been peeled by the peeling mechanism 171, so that the optical member F11 to be excluded is bonded onto the tape 191. The optical member F11 to be excluded, together with the tape 191, is wound around a winding roller 193.

(5) After the exclusion, the pushing roller 181 is raised, and the roller 192 for exclusion is returned to the original position and the guide roller 182 is returned to the original position. The above-mentioned action is controlled by the controlling device 1.

Example 2 of Excluding Device

Example 2 of the first excluding device 19, which is illustrated in FIG. 5B, has a structure in which the optical member F11 to be excluded is excluded at the upstream side relative to the position where the optical display unit W and the optical member F11 are bonded onto each other. This structure is higher in productivity than the structure of Example 1 since the treatment for bonding the optical display unit W and the optical member F11 onto each other is not interrupted for a long period of time. The action of Example 2 of the first excluding device 19, which is illustrated in FIG. 5B, is described with reference to FIG. 7.

The first excluding device 19 is comprised of a peeling mechanism 195 for peeling the releasing film F12a from the first laminated optical product F1, a tape 191, a roller 192 for exclusion around which the tape 191 is wound, a pushing roller 194 for exclusion which pushes, toward the roller 192 for exclusion, the first optical member F11 to be excluded from which the releasing film F12a is peeled, a winding roller 193 for winding the tape 191 onto which the first optical member F11 to be excluded is bonded, and an accumulating device A arranged at the downstream side of the device. The roller 192 for exclusion and the pushing roller 194 for exclusion may each be an elastic roller (made of, for example, silicone rubber), or may be a roller made of metal. The action thereof is as follows.

(1) When the optical member F11 to be excluded is carried to the excluding position, the peeling mechanism 195 works to shift to the excluding position. The peeling mechanism 195 has a structure similar to that of the above-mentioned peeling mechanism, which has the knife edge region. However, this peeling mechanism 195 has a mechanism that is shifted to the excluding position when excluding treatment is conducted. The tip of the knife edge region of the shifted peeling mechanism 195 is positioned toward the roller 192 for exclusion, around which the tape 191 is wound, and the first optical member F11 from which the releasing film F12a is peeled is put onto the roller 192 for exclusion. The accumulating device A is in a driving state, and works in such a manner that the treatment for bonding the optical display unit W and the first optical member F11 onto each other is not interrupted during the excluding treatment.

(2) The roller 194 for exclusion is shifted to the bonding position, which is the excluding position.

(3) The pushing roller 194 for exclusion pushes, toward the roller 192 for exclusion, the pressure-sensitive adhesive layer F14 surface of the optical member F11 to be excluded so that the optical member F11 is pushed onto the tape 191. The optical member F11, together with the tape 191, is wound around the winding roller 193.

(4) After the exclusion, the pushing roller 194 for discharge is raised, and the peeling mechanism 195 is returned to the original position. The above-mentioned action is controlled by the controlling device 1.

Example 3 of Excluding Device

Example 3 of the first excluding device 19, which is illustrated in FIG. 5C, has a structure in which the optical member F11 to be excluded is excluded at the upstream side relative to the position where the optical display unit W and the optical member F11 are bonded onto each other. This structure is higher in productivity than the structure of Example 1 since the treatment for bonding the optical display unit W and the optical member onto each other is not interrupted for a long period of time. The action of Example 3 of the first excluding device 19, which is illustrated in FIG. 5C, is described with reference to FIG. 8. The first excluding device 19 is comprised of a pressure-sensitive adhesive tape 191, a roller 192 for exclusion around which the pressure-sensitive adhesive tape 191 is wound, and a winding roller 193 for winding the pressure-sensitive adhesive tape 191. Example 3 is not equipped with the peeling mechanism 195, the pushing roller 194 nor the accumulating device A as in Example 2. Thus, Example 3 makes it possible to make the device simple. The action thereof is as follows.

(1) When the optical member F11 to be excluded is carried to the excluding position, the roller 192 for exclusion, around which the pressure-sensitive adhesive tape 191 is wound, is shifted by the side of the roller 12 at the excluding position. The excluding position is, for example, the roller 121 of the carrying device 12.

(2) The roller 192 for exclusion pushes, toward the roller 121, the first optical member F11 so that the first optical member F11 to be excluded is bonded onto the pressure-sensitive adhesive tape 191. The optical member F11, together with the pressure-sensitive adhesive tape 191, is wound around the winding roller 193.

(3) After the exclusion, the roller 192 for exclusion is returned to the original position. The system acts in such a manner that the treatment for bonding the optical display unit W and the first optical member F11 onto each other is not interrupted during the excluding treatment. The above-mentioned action is controlled by the controlling device 1.

The following will describe a second excluding device 29 for excluding the second optical member F21 to be excluded. The structure and the action of the second excluding device 29 illustrated in FIG. 10A are similar to the structure in FIG. 5A and the action thereof, respectively. When, for example, a defect-containing second optical member F21 out of the second optical members F21 is carried to the bonding position, a guide roller 282 is shifted vertically and upward. Next, a roller 292 for exclusion around which a tape 291 is wound is shifted to the bonding position, which is the position where the guide roller 282 is fixed. A pushing roller 281 is shifted vertically and upward to push the pressure-sensitive adhesive layer F24 surface of the defect-containing second optical member F21 onto the tape 291 to adhere the second optical member F21 onto the tape 291. The defect-containing second optical member F21, together with the tape 291, is then wound around a roller 293.

Figure 10B:
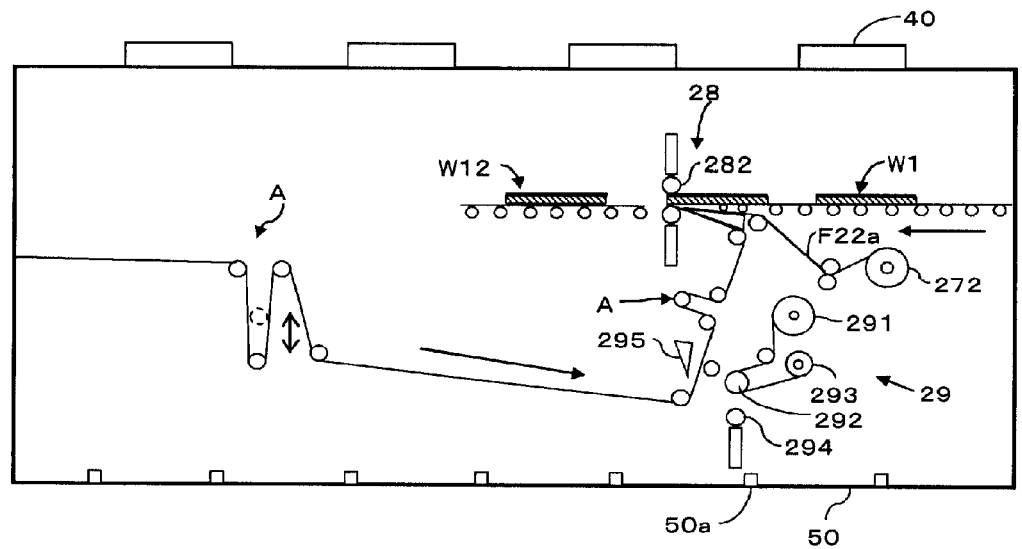
FIG. 10B A view for explaining a device structure of the manufacturing system.
Figure 10C:
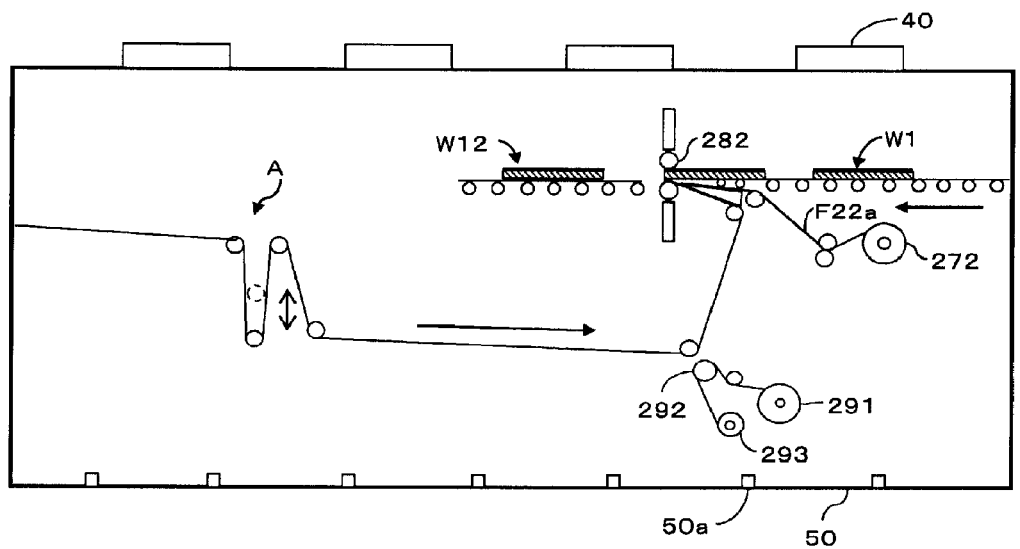
FIG. 10C A view for explaining a device structure of the manufacturing system.

The structure of a second excluding device 29 illustrated in FIG. 10B is similar, in effect structure, to the structure in FIG. 5B. The structure of a second excluding device 29 illustrated in FIG. 10C is similar to that in FIG. 5C; the action thereof is also similar although they are different from each other in arrangement position.

Manufacturing System of Another Embodiment

Figure 11:
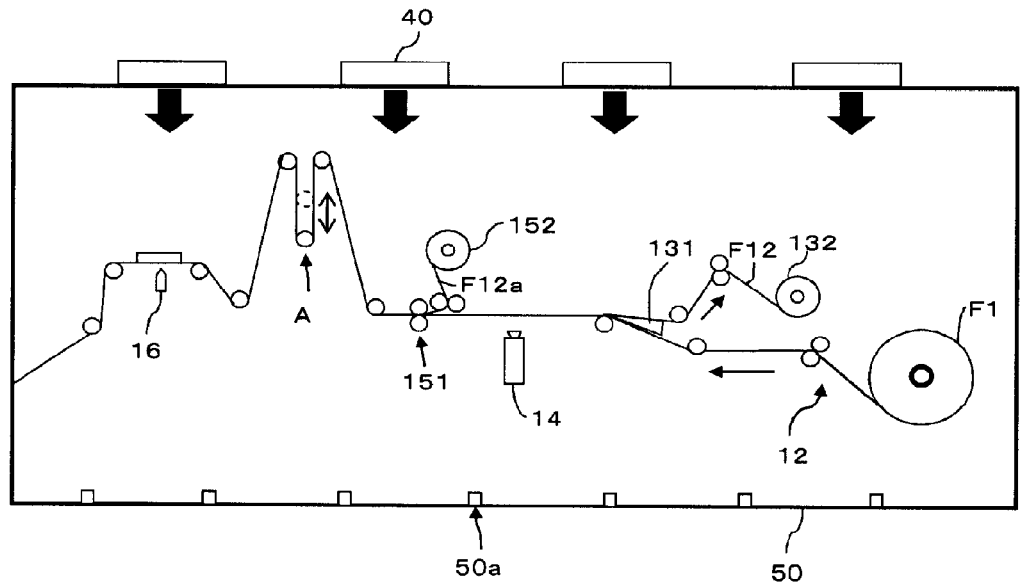
FIG. 11 A view for explaining a device structure of a manufacturing system.

Hereinafter, another manufacturing system will be described with reference to FIGS. 11 to 14C. A first laminated optical product F1 in FIG. 11 is carried to face its releasing film F12 upward. The structure and the function of each of a first pre-inspection peeling device 13, a first defect inspecting device 14, a first releasing film bonding device 15 and a first cutting device 16 are the similar to those described above. However, the arrangements of these members are different in accordance with the positions of the releasing film F12 and a releasing film F12a.

Figure 12A:
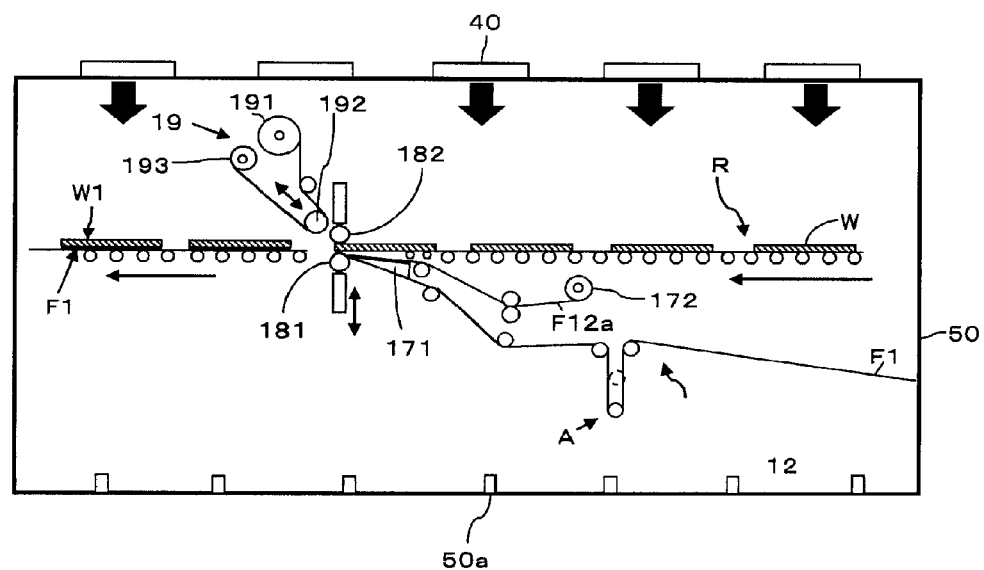
FIG. 12A A view for explaining a device structure of a manufacturing system.
Figure 12B:
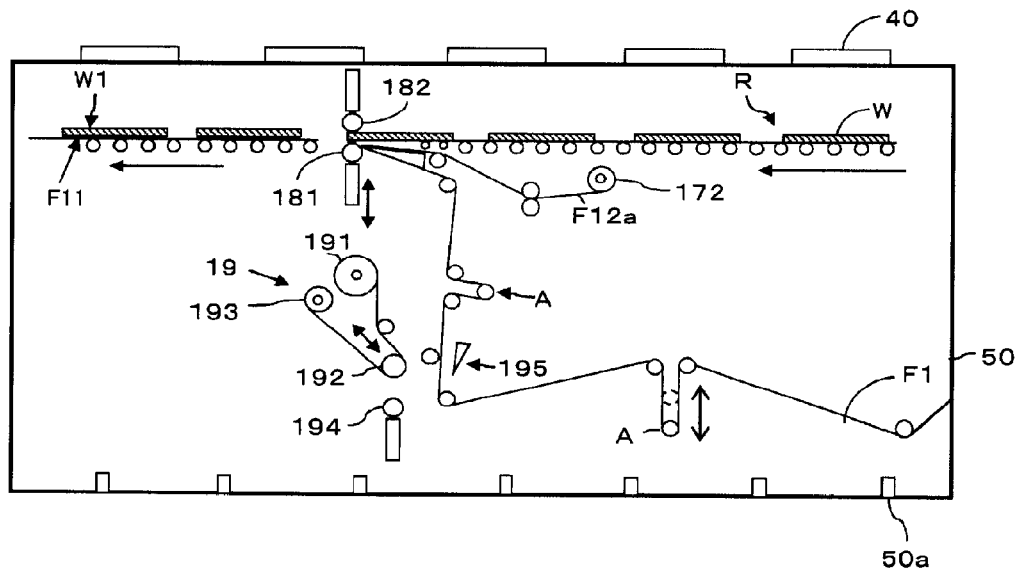
FIG. 12B A view for explaining a device structure of the manufacturing system.
Figure 12C:
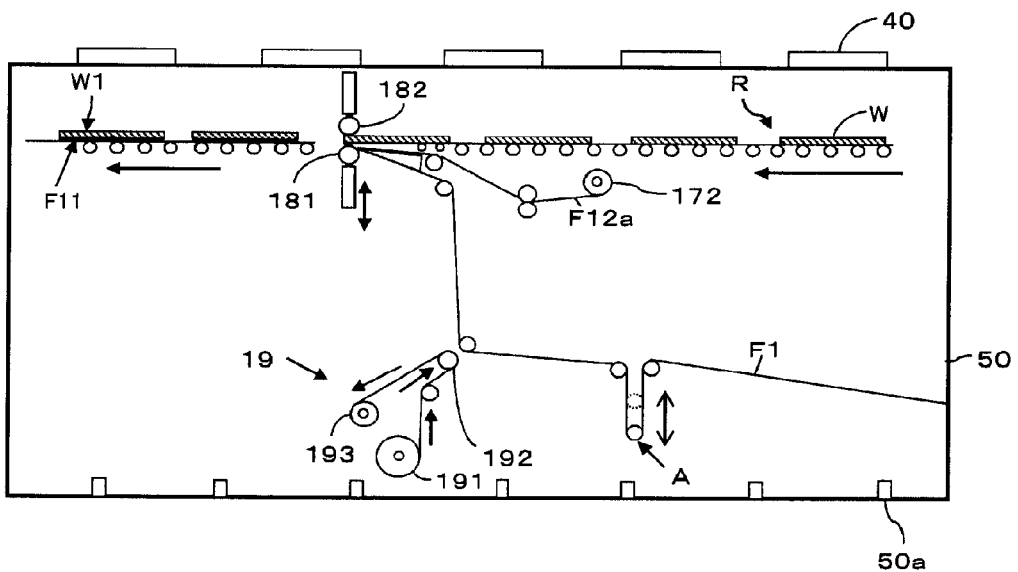
FIG. 12C A view for explaining a device structure of the manufacturing system.

In the same manner, the structure and the function of each of a first peeling device 17, a first bonding device 18 and a first excluding device 19 in FIGS. 12A to 12C are similar to those described above. However, the arrangements of these members are different in accordance with the position of a releasing film F12a.

Figure 13:
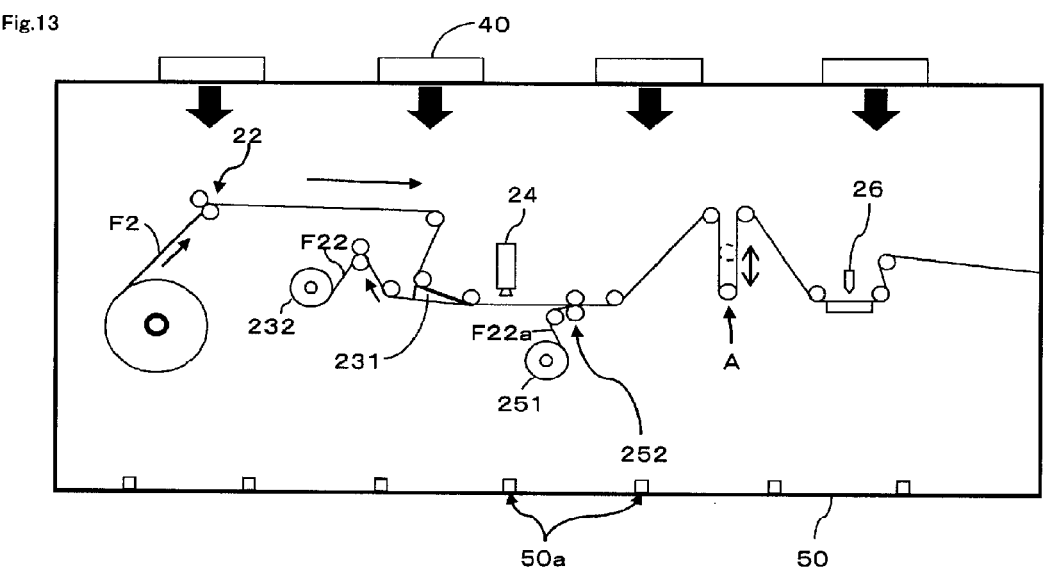
FIG. 13 A view for explaining a device structure of a different manufacturing system.

A second laminated optical product F2 in FIG. 13 is carried to face its releasing film. F22 downward. The structure and the function of each of a second pre-inspection peeling device 23, a second defect inspecting device 24, a second releasing film bonding device 25 and a second cutting device 26 are similar to those described above. However, the arrangements of these members are different in accordance with the positions of the releasing film F22 and a releasing film F22a.

Figure 14A:
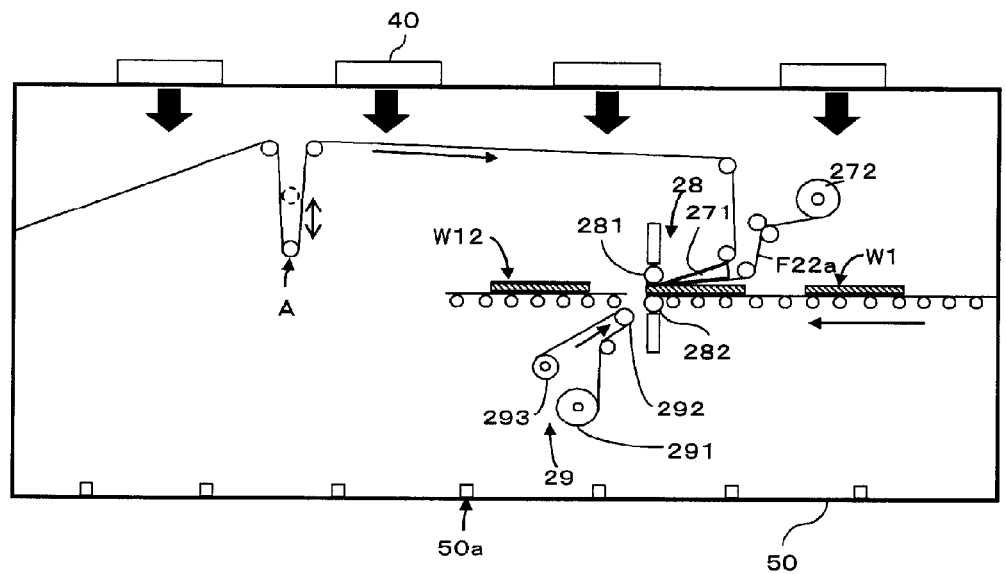
FIG. 14A A view for explaining a device structure of a different manufacturing system.
Figure 14B:
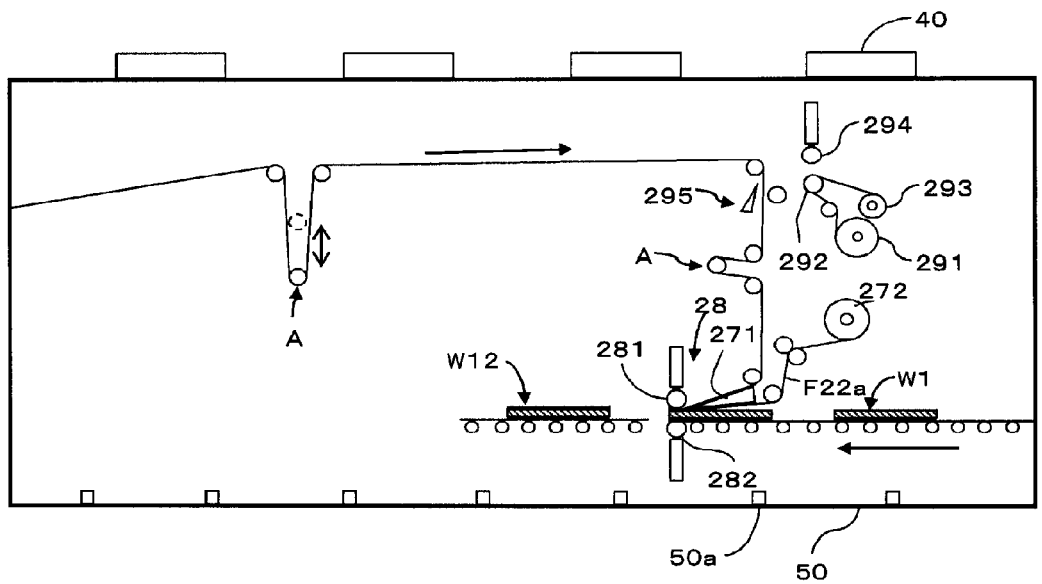
FIG. 14B A view for explaining a device structure of the different manufacturing system.
Figure 14C:
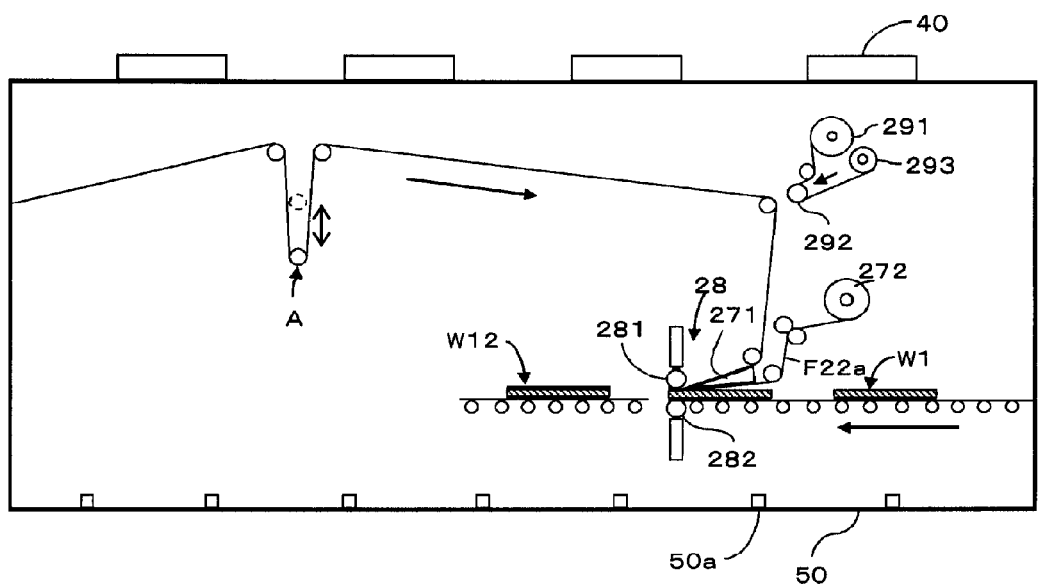
FIG. 14C A view for explaining a device structure of the different manufacturing system.

In the same manner, the structure and the function of each of a second peeling device 27, a second bonding device 28 and a second excluding device 29 in FIGS. 14A to 14C are also similar to those described above. However, the arrangements of these members are different in accordance with the positions of releasing films F22 and F22a.

The invention claimed is:

1. A manufacturing system of an optical display device having an optical display unit and an optical member of a predetermined size bonded onto the optical display unit, said system comprising:
   an excluding device configured to exclude, from a releasing film on which the optical member of the predetermined size and an optical member to be excluded are formed;
   a peeling device arranged on a downstream side of the excluding device in a carrying direction, said peeling device configured to peel the optical member of the predetermined size from the releasing film on which the optical member of the predetermined size is formed and from which the optical member to be excluded is excluded by the excluding device;
   a bonding device configured to bond the optical member of the predetermined size, peeled by the peeling device, onto the optical display unit; and
   an accumulating device arranged between the excluding device and the bonding device, said accumulating device configured to shift so as to accumulate the releasing film on which the optical member of the predetermined size is formed so as to continue the treatment of bonding the optical member of the predetermined size onto the optical display unit by the bonding device while the excluding device excludes the optical member to be excluded, wherein the excluding device comprises a peeling means configured to fold back the releasing film inwards, thereby peeling the optical member to be excluded from the releasing, film at an upstream position relative to the bonding device, and a rotatable roller for exclusion around which a tape member is wound, the excluding device is configured to bond the optical member to be excluded and peeled by the peeling means onto the tape member, and the peeling means of the excluding device is configured to shift toward the roller for exclusion so as to fold back the releasing film inwards when the optical member to be excluded, which is formed on the releasing film, is carried to the peeling means, and so that the optical member to be excluded is peeled from the releasing film foldbacked inwards by the peeling means and is sent to the tape member wound around the roller for exclusion.

2. The manufacturing system according to claim 1, wherein the optical member to be excluded is formed on the releasing film with a pressure-sensitive adhesive layer interposed therebetween, the peeling means of the excluding device peels the optical member to be excluded from the releasing film, leaving the pressure-sensitive adhesive layer laid on the optical member to be excluded, and the optical member to be excluded is bonded onto the tape member through the pressure-sensitive adhesive layer.

3. The manufacturing system according to claim 2, wherein the tape member is a tape wherein no pressure-sensitive adhesive is formed on.

4. A manufacturing method of an optical display device having an optical display unit and an optical member of a predetermined size bonded onto the optical display unit, comprising:

an excluding step of excluding, from a releasing film on which the optical member of the predetermined size and an optical member to be excluded are formed, a peeling step of being performed downstream of the excluding step in a carrying direction and peeling the optical member of the predetermined size from the releasing film on which the optical member of the predetermined size is formed and from which the optical member to be excluded is excluded in the excluding step, a bonding step of bonding the optical member of the predetermined size peeled in the peeling step, onto the optical display unit, and an accumulating step of accumulating the releasing film on which the optical member of the predetermined size is formed, is conducted by an accumulation device configured to shift so as to continue the treatment of bonding the optical, member of the predetermined size onto the optical display unit while the optical member to be excluded is excluded in the excluding step, wherein the excluding step has a peeling treatment of being performed upstream relative to the bonding step and, using a peeling means for folding back the releasing film inwards, thereby peeling the optical member to be excluded from the releasing film, and a bonding treatment of bonding the optical member to be excluded, peeled in the peeling treatment, onto a tape member wound around a rotatable roller for exclusion, and the excluding step further has a treatment, of shifting the peeling means toward the roller for exclusion so as to fold back the releasing film inwards when the optical member to be excluded, which is formed on the releasing film, is carried to the peeling means, and a treatment of sending, in the peeling treatment, the optical to be excluded, which is peeled from the releasing film fold backed inwards to the tape member wound around the roller for exclusion.

5. The manufacturing method according to claim 4, wherein the optical member to be excluded is formed on the releasing film with a pressure-sensitive adhesive layer interposed therebetween, the peeling treatment in the excluding step is a treatment of peeling the optical member to be excluded from the releasing film, leaving the pressure-sensitive adhesive layer on the optical member to be excluded, and the bonding treatment is a treatment of bonding the optical member to be excluded is bonded onto the tape member through the pressure-sensitive adhesive layer.

6. The manufacturing method according to claim 5, wherein the tape member is a tape wherein no pressure-sensitive adhesive is formed on.

* * * * *